United States Patent [19]

DeSanto

[11] Patent Number: 4,711,025

[45] Date of Patent: Dec. 8, 1987

[54] METHOD AND APPARATUS FOR FORMING ELECTRICAL HARNESSES

[76] Inventor: Joseph J. DeSanto, 14 Hillcrest Rd., Belle Mead, N.J. 08502

[21] Appl. No.: 860,004

[22] Filed: May 5, 1986

[51] Int. Cl.$^4$ .................... H01R 43/00; H02G 3/00
[52] U.S. Cl. ................................ 29/854; 174/72 A; 29/407; 29/755
[58] Field of Search ............... 29/407, 747, 850, 423, 29/755; 174/72 A

[56] References Cited

U.S. PATENT DOCUMENTS

| | | |
|---|---|---|
| 3,024,301 | 3/1962 | Walch . |
| 3,188,722 | 6/1965 | Lorch .................................. 29/423 |
| 3,194,279 | 7/1965 | Brown . |
| 3,258,039 | 6/1966 | Ewalt . |
| 3,409,971 | 11/1968 | Morrow . |
| 3,540,110 | 11/1970 | Seltwartz . |
| 3,633,096 | 1/1972 | Bollman ............................ 29/407 |
| 3,693,228 | 9/1972 | Logan .............................. 29/755 X |
| 3,839,777 | 10/1974 | Puzio . |
| 3,842,496 | 10/1974 | Mercer ........................ 174/72 A X |
| 3,872,547 | 3/1975 | Caveney et al. . |
| 3,872,549 | 3/1975 | Elyea . |
| 3,905,570 | 9/1975 | Nieuwveld . |
| 3,930,524 | 1/1976 | Tarbox ............................ 29/755 X |
| 3,949,457 | 4/1976 | Fortsch . |
| 4,009,852 | 3/1977 | Bulanda et al. . |
| 4,029,277 | 6/1977 | Bulanda . |
| 4,099,852 | 7/1978 | Kobierecki et al. . |
| 4,154,977 | 5/1979 | Verma ......................... 174/72 A X |
| 4,210,773 | 7/1980 | Haley et al. ................... 174/72 AK |
| 4,278,223 | 7/1981 | Fauteuk . |
| 4,300,284 | 11/1981 | Reeder . |
| 4,337,934 | 7/1982 | Caveney . |
| 4,424,627 | 1/1984 | Tarbox . |

OTHER PUBLICATIONS

IBM Technical Disclosure Bulletin, vol. 20, No. 12, May 1978, p. 5141, by Smith.

Primary Examiner—Howard N. Goldberg
Assistant Examiner—Carl J. Arbes
Attorney, Agent, or Firm—Richard C. Woodbridge

[57] ABSTRACT

An electrical harness is assembled on a board having detachable wire holders so that the entire unit can be readily transferred to an electrical chassis. The wire holders include tie wraps that are attached with a Velcro ®-like material to the wiring board. When the harness assembly is complete, it is removed and placed in an electronic chassis having corresponding Velcro ®-like targets. Assembly of the wire harness is faciltated by a microprocessor which indicates where each individual wire begins and ends. The microprocessor controls a group of wire terminator units each of which include a greed LED and a red LED for indicating the beginning and end of a wire. Each wire terminator unit also includes an LED/photodiode circuit for detecting the presence or absence of a wire. Therefore, the harness assembler is directed by the microprocessor to route a wire through a specific location. If a wire has been correctly routed, as determined by the LED/-photodiode detection units, then the assembler is instructed to proceed with the next wire step. The invention significantly improves the efficiency, accuracy, and economy associated with the assembly of electrical harnesses for electronic devices.

14 Claims, 17 Drawing Figures

METHOD AND APPARATUS FOR FORMING ELECTRICAL HARNESSES

BACKGROUND OF THE INVENTION

1. Field of the Invention

The invention relates to an apparatus for assembling electrical wire harnesses.

2. Description of the Related Art

The prior art does disclose a few devices for assisting in the assembly of electrical wire harnesses. The Panduit Corporation of Tinley Park, Illinois produces a line of harness board accessories including wire retainers, corner posts, harness board nails, T-junction fixtures, fanning strip systems, wire end holders and spring wire break-out devices. Those devices are further described in U.S. Pat. Nos. 4,029,277 and 4,337,934, both assigned to the Panduit Corporation.

U.S. Pat. Nos. 3,194,279 and 3,258,039 disclose other types of holders and supports employed for forming wire harnesses. Similarly, IBM Technical Disclosure Bulletin, Vol. 20, No. 12, May 1978, page 5141 discloses a related retainer mechanism for forming wire harnesses.

Lastly, U.S. Pat. No. 4,424,627 discloses a technique for assembling wire harnesses and identifying which wires go where.

The following prior art patents are also believed to be of interest but of less relevance: U.S. Pat. Nos. 3,024,301; 3,409,971; 3,540,110; 3,839,777; 3,872,547; 3,872,549; 3,905,570; 3,949,457; 4,009,852; 4,099,852; 4,278,223 and 4,300,284.

While many prior art devices are useful, they appear to suffer from two major shortcomings. First of all, it normally takes more than one step to remove the harness from the assembly board and to place it in a chassis.

Secondly, while rudimentary techniques do exist for directing the proper placement of the electrical wires that comprise a harness, none has yet performed the function in an efficient and electrically automated fashion.

SUMMARY OF THE INVENTION

Briefly described the invention comprises an apparatus for improving the ease and efficiency of the assembly of electrical wire harnesses. Initially, a board having a Velcro ®-like surface is laid out with wire tie holders and wire end holders. Velcro ® is the registered trademark of Velcro, Inc., 406 Brown Avenue, Manchester, N.H. 03101. The wire tie holders and wire end holders also include a Velcro ®-like surface which easily mates with the surface of the board. Each of the wire end holders is connected to a microprocessor and display unit. The microprocessor controls the illumination of red and green LED's on the wire end holders. A green start LED indicates where a wire should begin and a red stop LED indicates where a wire should end. Each wire end holder also includes an LED/photodiode pair for detecting the presence or absence of a wire. Therefore, initially a single green and a single red LED will be illuminated indicating where an individual wire should start and terminate. Information on the CRT may also indicate the length of the wire, wire size, color, and its route between the green LED and the red LED. After the assembler has placed the start end of the first wire in its correct position the green LED will extinguish (breaking the photo path of the photo diode/transistor couple). When the wire laying operation is complete with the placing of the wire in the red LED terminator, the absence of current flow in both the "start" and "stop" current sense lines indicates that the first wire is completed. The microprocessor then processes the next wire from the software programmed run list and illuminates a second green LED and a second red LED to continue the next wire of the wiring process. The harness assembler then places the second wire between the second green LED and the second red LED and the process is repeated until the harness is completely assembled. Next, the harness assembler removes the wire harness and wire ties as a single unit. The wire ties still include their Velcro ® bases. The electronic chassis to be wired has pre-installed Velcro ®-like targets which are located to mate with the Velcro ®-like materials on the base of the wire tie units. Therefore, all the assembler has to do is merely pull the wire harness off of the assembly board and place it directly into the electronic chassis so that the Velcro ®-like bases of the wire ties directly engage the Velcro ®-like targets in the chassis.

These and other features of the invention will be more fully understood by reference to the following drawings.

DETAILED DESCRIPTION OF THE INVENTION

During the course of this description like numbers will be used to indicate like elements according to the different figures that illustrate the invention.

A simplified embodiment of the invention 10 is illustrated in FIGS. 1A–1D. The basic invention 10 is shown to include a wiring board 12, a plurality of wire gathering tie means 14 and a group of wire end holding terminator means 16. An assembled electrical wire harness 44 is shown in its completed state in FIG. 1A.

Figure 1A:
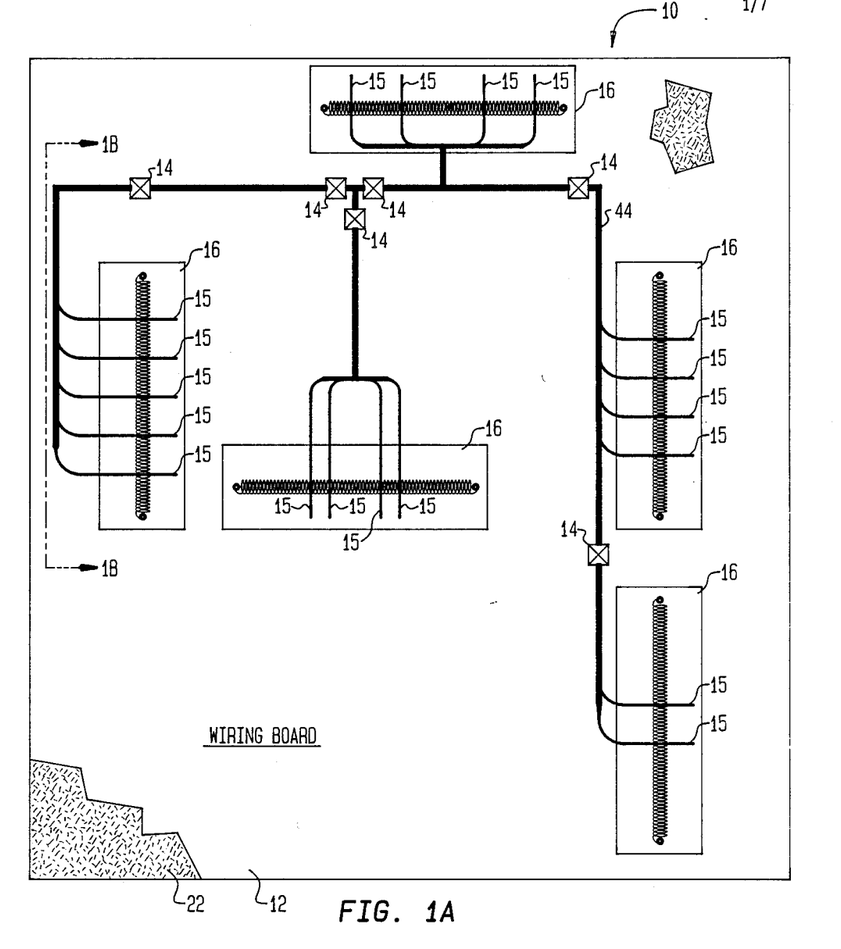
FIG. 1A is a top plan view of an electrical wire assembly apparatus according to one embodiment of the invention.
Figure 1B:
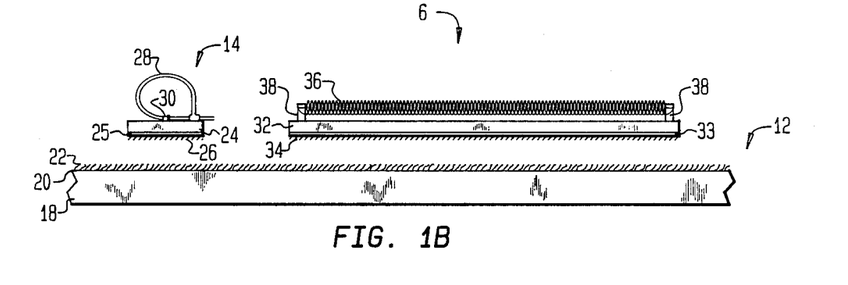
FIG. 1B is a partial vertical cross sectional view of the apparatus illustrated in FIG. 1A.

Wiring board 12 includes a wooden or plastic substrate 18, connected by a glue interface 20 to a Velcro ®-like surface 22. The wire gathering tie units 14 preferably include a base 24 connected to a Velcro ®-like surface 26 by a glue interface 25. A wire tie wrap 28 is connected by a hold-down clip 30 to the base portion 22". The wire wrap retainers 28 are standard items that may be purchased from suppliers such as the Panduit Corporation, Tinley Park, Illinois. It is also possible to attach other items such as additional springs, hold downs, C-clips and other conventional wiring aids to a board with a Velcro ®-like material in view of the foregoing teaching. The were end holding units 16 similarly include a wooden or plastic base 32 connected to a Velcro ®-like surface 34 by a glue interface 33. Base 32 supports a pair of posts 38 which engage opposite ends of terminator spring 36. The Velcro ®-like surface 32 is complimentary to the Velcro ®-like surfaces 26 and 34. For example, if Velcro ®-like surface 22 was male, then the Velcro ®-like surfaces 26 and 34 would be female and vice versa.

In order to assemble a harness 44, the assembler first determines where the individual wires 15 begin and end and places the wire end holding units 16 in the correct relative positions. Next the assembler places the wire gathering tie wrap units 14 at locations where it was desirable to bundle the individual wires 15. Finally assembler cuts the individual wires 15 to length and places one end in the appropriate wire end holder spring 36, threads the remaining end through the wire gathering units 14 and then place the unconnected free end of the wire 15 in the spring 36 of a remaining wire end holder unit 16. When all of the individual wires 15 have been correctly positioned the wire ties 28 are tightened or gathered so as to immobilize the electrical harness 44.

An electrical chassis board 40 is illustrated in FIG. 1 prior to the installation of electrical harness 44. A plurality of Velcro ®-like targets 42 are shown in FIG. 1C in the same relative position as are the wire gathering units 14 in FIG. 1A. The Velcro ®-like targets 42 are of the same character as the Velcro ®-like surface 22 on the wiring board 12. Therefore, if Velcro ®-like surfaces 26 and 34 are male, then Velcro ®-like targets 42 would be female and vice versa. A variety of common electrical components 46 are also shown mounted on board 40 at the locations where they would preferably be found.

Figure 1C:
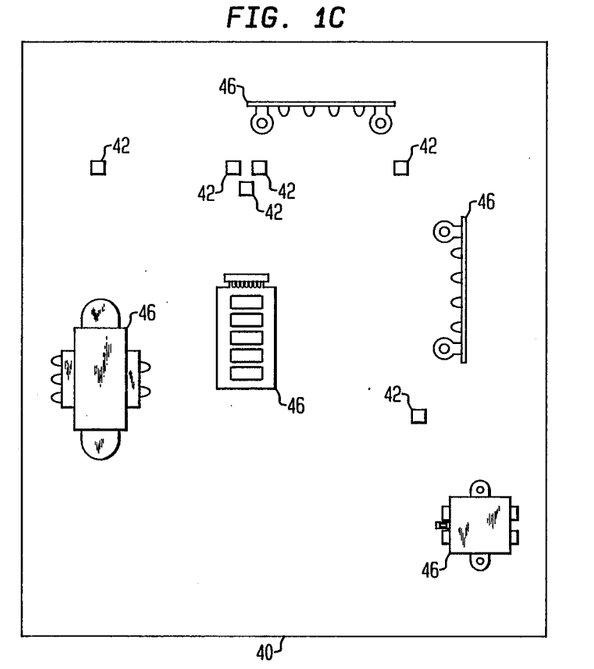
FIG. 1C is a top plan view of an electronic chassis prior to the placement of an assembled electrical harness therein.
Figure 1D:
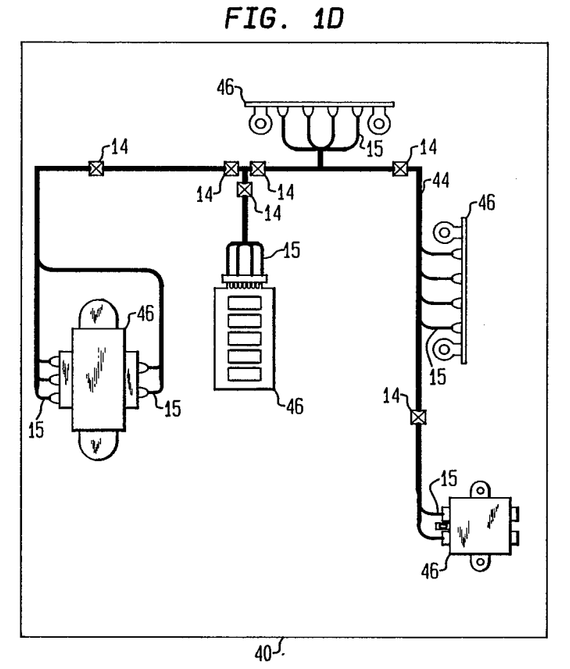
FIG. 1D is a top plan view of the electrical chassis illustrated in FIG. 1C after the electrical harness has been placed therein.

_ FIG. 1D illustrates the electrical harness 44 when correctly positioned and connected to the components 46 on the chassis board 40 of FIG. 1C. It is relatively easy to mount the electrical harness 44 on the chassis board 40. After the wire harness 44 has been assembled, as previously described with respect to FIG. 1A, the assembler merely pulls the wire tie gathering units 14 off of the wiring board 12 so that the Velcro ®-like surfaces 26 release from the Velcro ®-like surface 22 of the wiring board 12. The ends of each wire 15 are readily slipped out of the flights of wire end holding springs 36. Next, the assembler places the harness 44 on the board 40 so that the Velcro ®-like surface 26 of the wire tie gathering units 14 line up directly above and opposite the complimentary Velcro ®-like targets 42. The application of a slight downward pressure will cause the wire tie gathering units 14 to mate with the Velcro ®-like targets 42 thereby securing the harness 44 to the chassis board 40. Finally, the ends of the wires 15 are connected to the appropriate contacts on electronic components 46. The foregoing method, facilitated by the apparatus just described, is believed to be considerably simpler and more efficient than other known techniques for assembling and installing electrical harnesses.

Figure 2:
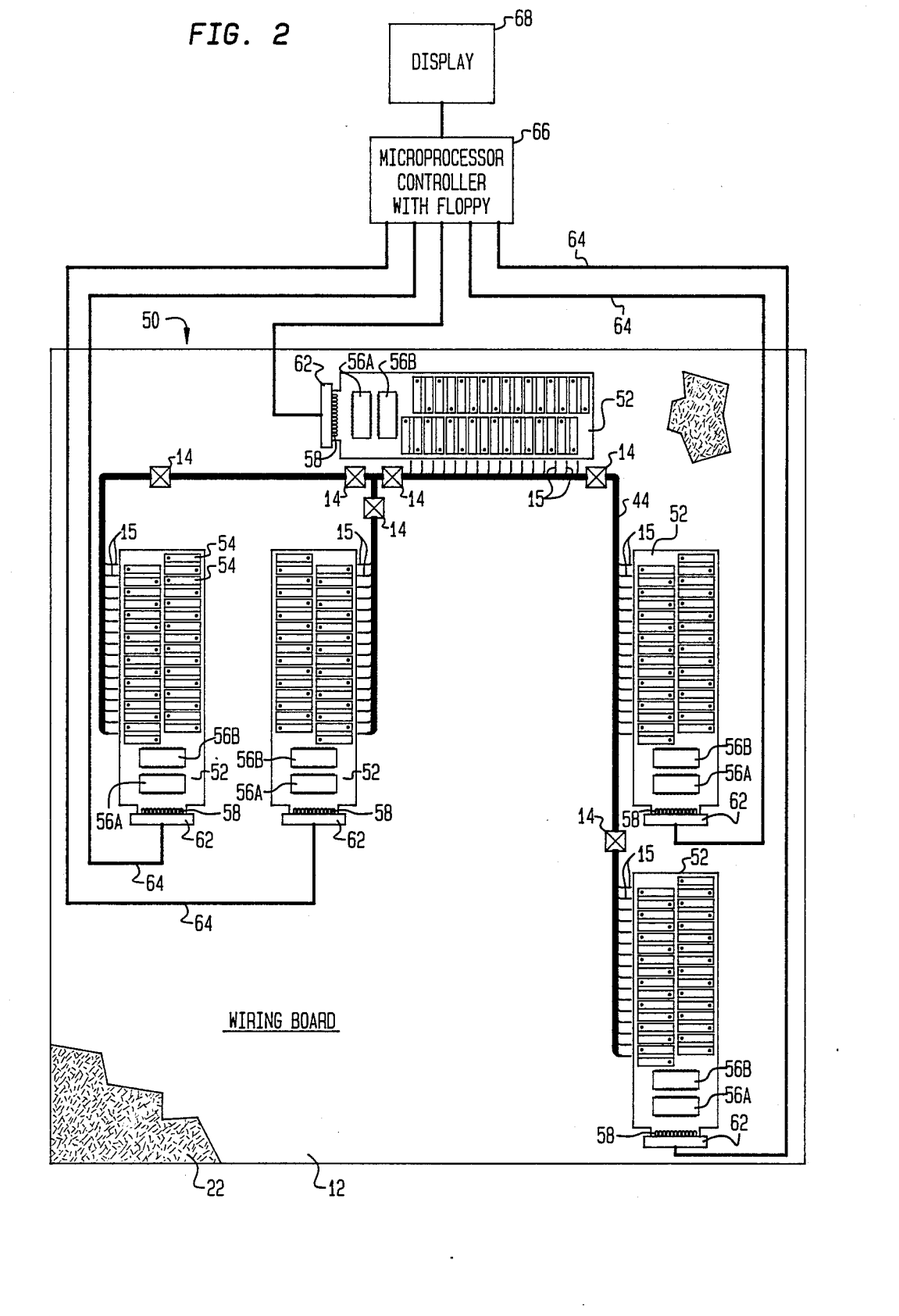
FIG. 2 is a top plan view of the preferred embodiment of the invention including a microprocessor control device for signalling the beginning and ending locations for each wire that forms the harness.
Figure 6A:
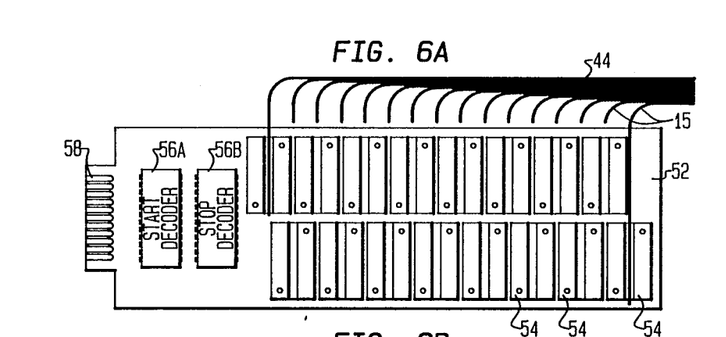
FIG. 6A is a top plan view of a wire terminator board including two decoder circuits and sixteen wire terminator units and having the circuit illustrated in FIG. 5D.
Figure 6B:
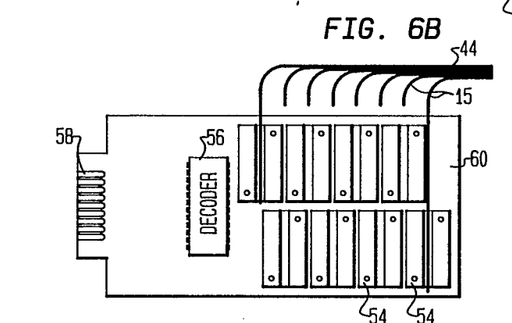
FIG. 6B is a top plan view of an alternative embodiment of a wire terminator board including only one decoder circuit and eight wire terminator units and having the circuit illustrated in FIG. 5C.
Figure 6C:
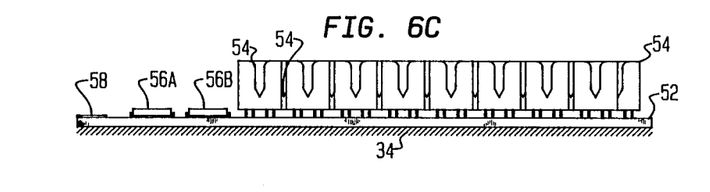
FIG. 6C is a side elevation view of the wire terminator board illustrated in FIG. 6A.

The preferred embodiment 50 of the present invention is illustrated in FIG. 2. Preferred embodiment 50 differs from the basic embodiment 10 in that the preferred embodiment 50 includes specific means for indicating the routing of each of the wires 15 that comprise harness 44. The wire tie gathering units 14 of the preferred embodiment 50 are essentially the same as the wire gathering units 14 of the basic embodiment 10. However, the wire end holding units 52 are different from the wire end holding units 16 in that the wire end holding units 52 include a plurality of electronic wire terminator blocks 54. Each wire end terminator block 54 is associated with at least one decoder circuit 56. The details of the wire end connector boards are shown in FIGS. 6A through 6C. Each board 52 has an associated set of connection terminals 58 which mate with female connectors sockets 62 mounted on the wiring board 12. Each decoder circuit 56 can handle up to eight wire terminator units 54. Accordingly, the sixteen wire terminator units 54 illustrated in the embodiment 52 shown in FIG. 6A are controlled by two decoder circuits 56A and 56B. An alternative embodiment 60 of a wire end terminator board is illustrated in FIG. 6B. Embodiment 60 includes only eight wire end terminator units 54 and therefore requires only one decoder circuit 56.

The female connector plugs 62 are connected to a microprocessor controller unit 66 by a plurality of wires 64. Each microprocessor unit 66 includes a display console 68 for indicating the status of the assembly operation.

Details of the wire terminator units 54 and associated circuitry are illustrated in FIGS. 3–5D. A typical wire end terminator unit 54 is shown isolated in perspective in FIG. 3. Each wire end terminator 54 preferably includes a green start LED light 92, a red stop LED light 94 and a plurality of pins 96 that connect to the internal circuitry on wire end connector board 52. Every wire end terminator unit 54 is formed from a block-like housing and includes a cavity 70 for receiving the beginning or end of each wire 15. A resilient wire spring 72 including a detent portion 74 which extends into cavity 70 and serves to hold each wire 15 in position. A detent 76 in the wall of the cavity 70 is located opposite from the detent 74 in the resilient spring wire 72. Detents 74 and 76 are intended to resiliently hold each individual wire 15 in the start position 80. A pit 78 located at the bottom of cavity 70 is intended to receive the end of each wire 15 in a stop position 80. Accordingly, each wire end terminator unit 54 is adapted to receive the beginning and end of a wire 15.

Figure 4A:
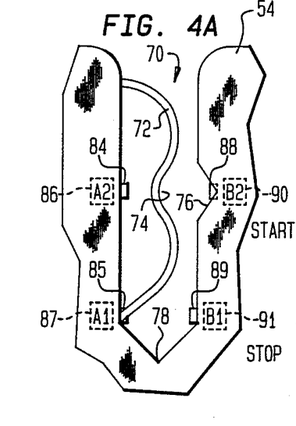
FIGS. 4A, 4B and 4C are partial cross sectional views of the wire terminator unit illustrated in FIG. 3 showing the locations of wires in the start and stop positions.
Figure 4B:
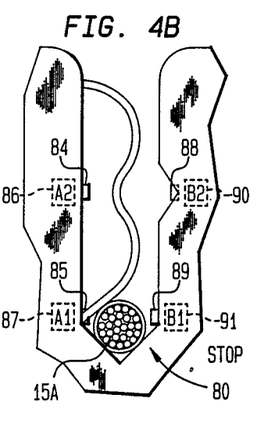
Figure 4C:
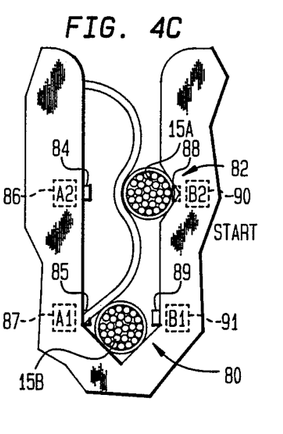
Figure 4D:
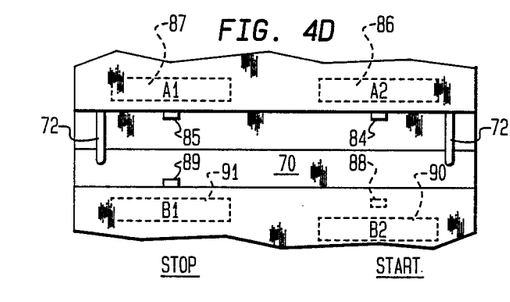
FIG. 4D is a partial top plan view of the start and stop LED/photodiode detectors associated with each of the terminator unit.

FIG. 4D is a top plan view of the cavity 70 illustrated in FIGS. 4A–4C. A pair of resilient wire springs 72 are preferably located at opposite ends of cavity 70. The presence of a wire 15B in the end or stop position 80 as illustrated in FIG. 4B is detected by photodiode 89. Photodiode 89 is illuminated by LED 85 which is controlled by associated circuitry 87. Similarly, photodiode 89 is controlled by associated circuitry 91 the output of which is connected to red LED 94 which comprises a photo darlington circuit. The presence of the wire end 15A in termination location 80 interrupts the beam between LED 85 and photodiode 89, thereby turning off LED 94 and signalling that information to the microprocessor unit 66. Similarly, LED 84, driven by associated circuitry 86 illuminates photodiode 88 which is controlled by associated circuitry 90. If the presence of the wire 15A in the start position 82 as shown in FIG. 4C, interrupts the light path between LED 84 and photodiode 88, that information causes the start LED 92, which comprises a photo darlington circuit, to turn off. Accordingly, the start and stop LED's 92 and 94 respectively are used to tell the harness assembler where to start and stop a wire 15A. The wire 15A is preferably started in the start position 82 as illustrated in FIG. 4C and terminated in the wire stop 80 location as illustrated in FIG. 4B.

Figure 3:
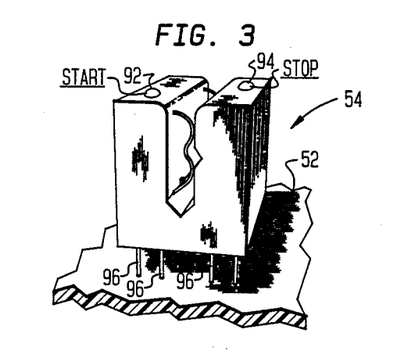
FIG. 3 is an end perspective view of a single wire terminator unit.

The module 54 in FIG. 3 is part of the preferred embodiment 50 of the invention. However, it would also be possible to integrate these functions into a single board so that individual modules 54 are not required. For example, the LED/photodiode pairs could be mounted directly on a board and the wires 15 could be routed through slots formed on the surface of the board. Leaf springs or the like could be used to hold the wires down during the assembly process.

Figure 5A:
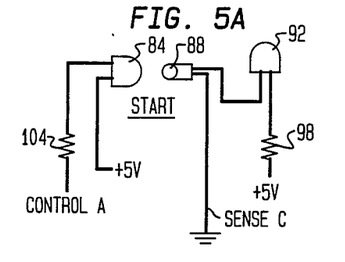
FIG. 5A is an electrical schematic illustrating a portion of the wire start signalling and detecting section.
Figure 5B:
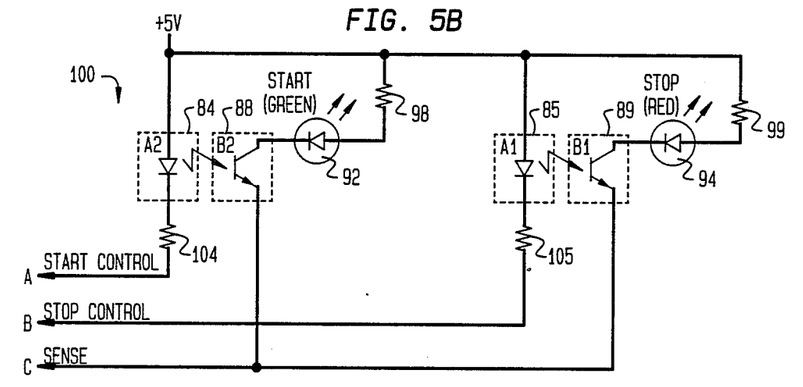
FIG. 5B is an electrical schematic illustrating the start and stop electronics of each wire terminator.

FIGS. 5A–5D illustrate details of the circuitry. FIG. 5A is a schematic diagram illustrating the electronics of the start circuit. A lead from the control circuit 66 is connected to LED 84 through a resistor 104. The other lead from LED 84 goes to a +5 volts power supply. The +5 volt power supply is also connected through resistor 98 to the red start LED 92. The other lead from the red start LED 92 is connected to photodiode 88 whose other terminal is connected to the sense line C. The electronic embodiment of the circuit illustrated in FIG. 5A is shown in FIG. 5B. The wiring of the stop circuit is virtually identical to the wiring of the start circuit except that one terminal of LED 85 is connected to start control line B rather than start control line A.

Figure 5C:
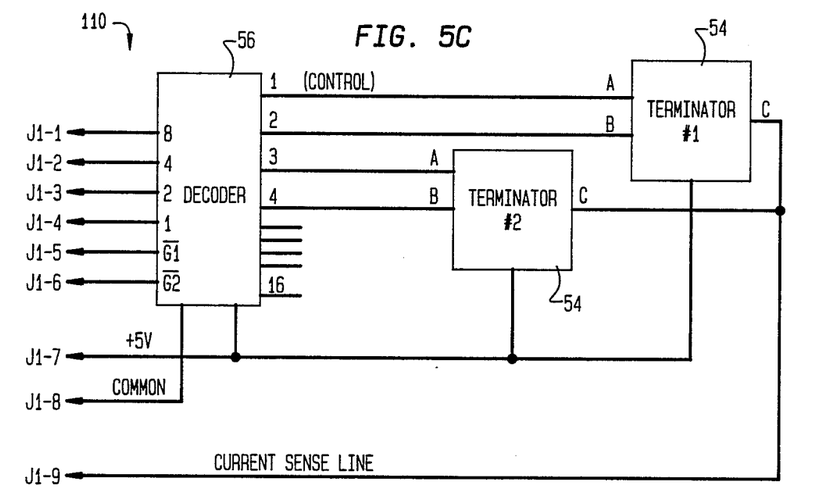
FIG. 5C is an electrical schematic of the connections made to each terminator board in which one decoder circuit services eight terminator units.

FIG. 5C illustrates the electronic circuit 110 associated with the alternative embodiment of the wire end connector unit 60 illustrated in FIG. 6B. According to embodiment 110 a single decoder 56 controls both the stop and start functions of each of the eight terminator units 54. As shown in FIG. 5C, the odd terminals, 1, 3, 5, etc. of decoder 56 go to the start terminal A of each of the eight terminators 54. Similarly, each of the even terminals, 2, 4, 6, . . . 16 of decoder 56 go to the stop terminal B of each of the eight terminators 54. A common sense line C connects each of the terminators 54 to microprocessor 66 via female jack 62 and lead 64.

Figure 5D:
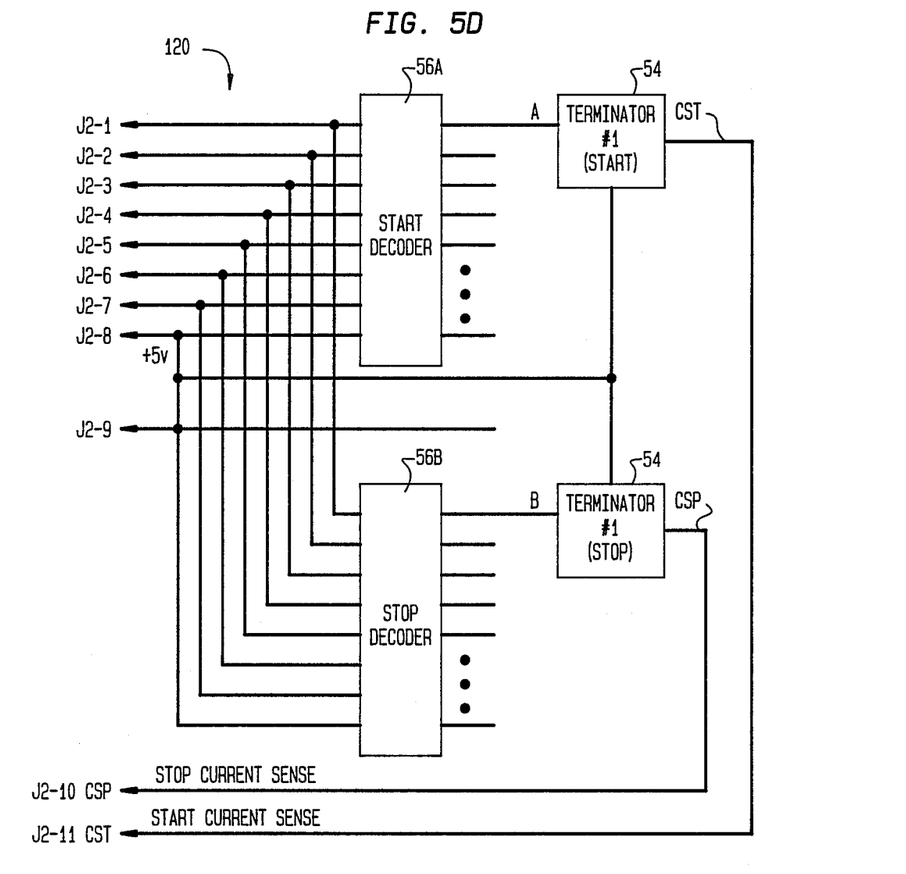
FIG. 5D is an electrical schematic of a sixteen unit terminator board in which one decoder circuit services all of the wire start circuits and another decoder circuit services all of the wire stop circuits.

Embodiment 120 illustrated in FIG. 5D is representative of the circuitry that might be employed with a wire end connector board unit 52 such as illustrated in FIG. 6A. In embodiment 120 each decoder circuit 56A is dedicated to controlling the start function of each of the sixteen terminators 54. Similarly, each decoder circuit 56B is dedicated to controlling the stop functions of each of the sixteen terminators 54. Decoder circuit 56A has eight inputs J2-1 through J2-8 and sixteen outputs, 1–16. Each of the sixteen outputs of decoder 56A goes to the start terminal A of each of the sixteen terminators 54. Likewise, decoder circuit 56B has eight input terminals J2-1 through J2-8 and sixteen output terminals each connected to the stop terminal B of the sixteen terminators 54. A stop current sense line from each of the terminators 54 is connected to output terminal J2-10. Similarly a start current sense line from each of the terminators 54 is connected to terminal J2-11. A common terminal J2-9 is connected to the +5 volt power supply. The eleven output terminals J2-1 through J2-11 of the two decoder embodiment 120 are connected through female jack 62 to the microprocessor controller 66 in the manner previously described.

| ELEMENT PARTS LIST | | |
|---|---|---|
| Description | Model No. or Part Val | Manufacturer |
| Matched Emitter Detector Pairs 84/88 & 85/89 | H23B1 | General Electric |
| Green LED 92 | LN 38GEP | Panasonic |
| Red LED 94 | LN 28RCP | Panasonic |
| 4 line to 16 line Decoder 56 | SN 74159 | Texas Instruments |
| Resistors 98 & 99 | 330 ohm/½ watt | |
| Resistors 104 & 105 | 220 ohm/½ watt | |
| Microprocessor 66 (micorputer with EPROM/RAM/A-D Converter/Timer and Input & Output Lines) | MC68705R5 | Motorola |

The operation of preferred embodiment 50 would typically take place in the following manner.

First, the assembler would begin by loading microprocessor 66 with machine instructions, typically in the form of software stored on floppy discs. The design and usage of software for this kind of purpose is well within the ability of those of ordinary skill in the art.

Second, the assembler follows the instructions on the display screen 68. Those instructions might typically include telling the assembler where to place wire end connector boards 52, where to locate wire tie gathering means 14, how many wires 15 to use, what length to cut the wires, what size wires to choose and what color coding should be used. In other words, all of the set up instructions could be included in the software instructions to microprocessor 66. Alternatively, the set up instructions could be separately provided to the assembler by means of a text or otherwise. As previously described, the layout of elements 14 and 52 is chosen to be essentially the same as the ultimate environment where the wire harness 44 will be connected.

Third, before a wire 15 is placed in a particular slot the microprocessor controller 66 will pretest the start 82 and stop 80 locations for that wire 15 to determine if the system is operable. Specifically the microprocessor controller 66 will look to see if the light generated by LEDs 84 and 85 is detected by photodiodes 88 and 89 respectively. A system fault is diagnosed if the light from LEDs 84 and 85 is not detected by photodiodes 88 and 89. Other self diagnostic pretests could also be programmed into he system. If the pretest is satisfactory the system will tell the next start LED 92 and next stop LED 94 to turn on after the previous wire has been completely routed.

Fourth, the harness assembler follows the start LED lights 92 and the stop LED lights 94 when placing the wires 15. Only one green LED light 92 and one red LED light 94 will be on at any given time. Therefore, the assembler will start by placing one end of a wire 15A in the terminator 54 associated with a green LED 92. The wire 15A will be located in the start position 82 as shown in FIG. 4C. Sensors 84 and 88 will sense the presence of the wire 15A and will preferably turn off start light 92 and signal that information to the microprocessor 66.

Fifth, the harness assembler snakes the wire 15A through the appropriate wire tie gathering units 14 to the location where the illuminated red LED stop light 94 is located.

Sixth, the harness assembler then places the remaining end of the wire 15A into the stop looation 80 of the other terminator 54 as shown in FIG. 4B. When the wire 15A is in the stop location 80, it interrupts the light path between LED 85 and photodiode 89 thereby causing the stop LED 94 to turn off. This information is signalled back to the microprocessor 66.

Seventh, microprocessor 66 receives the information that the first wire 15A has been laid from a start position 82 to a stop position 80 and then indexes to a second instruction and causes a second green start LED 92 and a second red stop LED 94 to turn on.

Eighth, the harness assembler repeats the process with a second wire 15B that he or she performed with the first wire 15A. The process is repeated until the wire harness 44 has been completely assembled.

Ninth, the harness assembler tightens the ties 28 to bundle the wires 15 together.

Tenth, the harness assembler removes the completed harness 44 from wiring board 12. The harness 44 carries with it the wire tie gathering units 14 but not the wire end connector units 52.

Eleventh, the harness assembler places the assembled harness 44 with wire tie gathering units 14 into an electronic chassis 40 such as shown in FIG. 1C so that the Velcro ®-like base 26 of the wire tie gathering units 14 contact the complimentary Velcro ®-like targets 42.

Twelth, finally, the assembler connects the free ends of the wires 15 to the electronic components 46 as shown in FIG. 1D. Alternatively, the assembler may preconnect some or all of the free ends 15 to connectors or components when the harness 44 is being formed on the forming board 12. This alternative approach would minimize the time and effort required to connect the free ends of wires 15 after the harness 44 has been placed in chassis 40.

While the invention has been described with reference to the preferred embodiment thereof, it will be appreciated by those of ordinary skill in the art that modifications can be made to the steps and structure of the invention without departing from the spirit and scope thereof.

I claim:

1. A method for assembling an electrical wire harness comprising the steps of:
   locating wire end terminating means having a Velcro ®-like base on a wiring board at locations where wires are to begin and end;
   locating wire gathering units having Velcro ®-like surfaces on their bases on said wiring board along the path where the wires of the electrical harness will pass;
   routing wires from wire end terminator units through wire gathering units until the complete wire harness is formed;
   tightening the wire gathering units so that the wires of the electrical harness stay in place;
   removing the assembled electrical harness and wire gathering units assembly from said wiring board;
   placing the assembled electrical harness in an electrical chassis having electronic components therein so that the Velcro ®-like surfaces of the wiring gathering mate units with Velcro ®-like targets on the electrical chassis thereby securing the harness to the electrical chassis; and,
   connecting the free wire ends of the electrical harness to the electrical components on the electronic chassis.

2. The method of claim 1 further comprising the step of:
   electronically signalling the start location for a given wire; and,
   electronically signalling the stop location for a given wire,
   whereby a harness assembler is directed to the appropriate location for the beginning and end of a wire.

3. The method of claim 2 further comprising the step of:
   detecting the presence of a wire in the start location;
   detecting the presence of a wire in the stop location; and,
   transmitting information regarding the presence of a wire in said start and stop locations to a microprocessor means thereby causing said microprocessor means to produce a second set of start and stop signals for the routing of a second wire.

4. The method of claim 3 furrther comprising the step of:
   repeating the foregoing steps until a complete wire harness assembly is formed.

5. An apparatus for forming a wire harness comprising:
   a board having a surface;
   a first type of attaching means covering at least a portion of said board surface for mating with a second type of attaching means;
   wire gathering means attached to said second type of attaching means for gathering and holding one or more electrical wires;
   wire end holding means also attached to said second type of attaching means for holding the end of one or more of said electrical wires,
   wherein one of said two types of attaching means comprises a hook material and the other of said two types of attaching means comprises a loop material so that said wire gathering means and said wire end holding means may be selectively attached to the surface of said board and a wire harness formed by running at least one of said electrical wires from one wire end holding means through at least one wire gathering means to at least one other wire end holding means.

6. The apparatus of claim 5 further comprising:
   wire start signalling means mounted on said wire end holding means for indicating the location where a wire should start;
   wire termination signalling means mounted on said wire end holding means for indicating where a wire should terminate; and, control means electrically connected to said wire start signalling means and said wire termination signalling means for selectively activating said wire start signalling means and said wire termination signalling means in order to indicate where an electrical wire should start and where an electrical wire should terminate respectively.

7. The apparatus of claim 6 further comprising:
wire start detecting means mounted on said wire end holding means and connected to said control means for detecting the presence of a wire in the wire start position; and,
wire termination detecting means also mounted on said wire end holding means and connected to said control means for detecting the presence of a wire in the wire termination position.

8. The apparatus of claim 7 wherein said control means includes a programmable microprocessor.

9. The apparatus of claim 8 further comprising:
CRT means connected to said microprocessor for visually displaying routing and wire selection information relative to the assembly of said harness.

10. The apparatus of claim 9 wherein said wire start signalling means and said wire termination signalling means include LED light indicators.

11. The apparatus of claim 10 wherein said wire start signalling means includes a green light LED and said wire termination signalling means includes a red light LED.

12. The apparatus of claim 11 wherein said wire start detecting means and said wire termination detecting means include photodetector means for detecting the presence of said wire, said photodetector means being connected to said wire start detecting means and said wire termination detecting means by a common current sensing line.

13. The apparatus of claim 12 wherein said photodetector means comprise:
LED means for generating light; and,
photodiode means for detecting light,
wherein a wire placed between said LED and said photodiode will interrupt the light from said LED thereby generating a signal for said control means.

14. The apparatus of claim 13 wherein said wire end holding means includes:
a housing having a cavity with wells therein for receiving individual harness wires; and,
a resilient wire spring means attached to said housing and located in said cacvity, said resilient wire spring means having a detent therein for holding at least one wire against the wall of said cavity.

* * * * *